United States Patent
Destraves

(10) Patent No.: US 10,242,512 B2
(45) Date of Patent: Mar. 26, 2019

(54) AUTONOMOUS ELECTRONIC SYSTEM

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventor: Julien Destraves, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 1 day.

(21) Appl. No.: 15/534,636

(22) PCT Filed: Dec. 10, 2015

(86) PCT No.: PCT/EP2015/079248
§ 371 (c)(1),
(2) Date: Jun. 9, 2017

(87) PCT Pub. No.: WO2016/092017
PCT Pub. Date: Jun. 16, 2016

(65) Prior Publication Data
US 2017/0358150 A1 Dec. 14, 2017

(30) Foreign Application Priority Data
Dec. 11, 2014 (FR) ...................... 14 62226

(51) Int. Cl.
*G07C 5/00* (2006.01)
*B60C 19/00* (2006.01)
*G07C 5/08* (2006.01)

(52) U.S. Cl.
CPC .............. *G07C 5/008* (2013.01); *B60C 19/00* (2013.01); *G07C 5/085* (2013.01)

(58) Field of Classification Search
CPC .......... G07C 5/008; G07C 5/085; B60C 19/00
See application file for complete search history.

(56) References Cited

U.S. PATENT DOCUMENTS 6,087,930 A * 7/2000 Kulka ................. B60C 23/0493
200/61.22
6,724,301 B2 * 4/2004 Ginman .............. B60C 23/0408
340/442

(Continued)

OTHER PUBLICATIONS

"Dynamic NFC/RIFD tags ISO15693 & I²C EEPROM," STMicroelectronics M24LR series, Jan. 2014, pp. 1-2, retrieved from: URL:http://www.st.com/st-web-ui/static/active/en/resource/sales_and_marketing/promotional_material/flyer/FLM24LR6400213.pdf.

(Continued)

*Primary Examiner* — Courtney D Heinle
(74) *Attorney, Agent, or Firm* — Venable LLP

(57) ABSTRACT

A self-powered electronic system, which is embeddable in a tire for a ground vehicle or a tire for an aerial vehicle, includes an electronic device, a transmitter, a storage medium, and communication means. The electronic device is structured to measure or record, or measure and record, data relating to a vehicle carrying the electronic device. The data may include information on use of the vehicle. The transmitter is structured to transmit the data to a remote interrogation system. The storage medium is a passive data storage medium that is structured to be able to be remotely interrogated. The communication means is structured to enable communication between the electronic device and the storage medium.

15 Claims, 1 Drawing Sheet

(56) References Cited

U.S. PATENT DOCUMENTS

| | | | |
|---|---|---|---|
| 8,354,925 B1* | 1/2013 | Libby | G08B 13/187 |
| | | | 340/506 |
| 9,162,776 B2* | 10/2015 | Shore | B64F 5/00 |
| 9,679,174 B2 | 6/2017 | Destraves et al. | |
| | | | G06K 7/10425 |
| 9,842,290 B2* | 12/2017 | Butler | G06K 19/0723 |
| 2002/0075145 A1* | 6/2002 | Hardman | B60C 23/0433 |
| | | | 340/442 |
| 2002/0126005 A1* | 9/2002 | Hardman | B60C 23/0433 |
| | | | 340/442 |
| 2004/0078662 A1* | 4/2004 | Hamel | B60C 23/0411 |
| | | | 714/22 |
| 2006/0184295 A1 | 8/2006 | Hawkins et al. | 701/33 |
| 2006/0244581 A1* | 11/2006 | Breed | B60C 23/0408 |
| | | | 340/447 |
| 2006/0290484 A1* | 12/2006 | Bauchot | B60C 23/0416 |
| | | | 340/442 |
| 2007/0114422 A1* | 5/2007 | Berkcan | B64D 43/00 |
| | | | 250/358.1 |
| 2007/0146124 A1* | 6/2007 | Shinmura | B60C 19/002 |
| | | | 340/447 |
| 2008/0033607 A1* | 2/2008 | Zeliff | B64D 45/0005 |
| | | | 701/31.4 |
| 2008/0126111 A1 | 5/2008 | Loda | 705/1 |
| 2011/0012723 A1* | 1/2011 | Adamson | B60C 23/0408 |
| | | | 340/447 |
| 2013/0176115 A1* | 7/2013 | Puleston | H04L 67/04 |
| | | | 340/10.51 |
| 2014/0104052 A1* | 4/2014 | Hammer | G06K 7/0008 |
| | | | 340/447 |
| 2014/0368327 A1* | 12/2014 | Darrer | G06K 19/07764 |
| | | | 340/447 |
| 2015/0029016 A1* | 1/2015 | Lesesky | B60C 23/045 |
| | | | 340/442 |
| 2015/0059461 A1* | 3/2015 | Ingram | B60C 23/0449 |
| | | | 73/146.5 |
| 2015/0224831 A1* | 8/2015 | Miller | B64D 47/00 |
| | | | 701/32.4 |
| 2016/0236523 A1* | 8/2016 | Moreau | B60C 23/008 |
| 2016/0379020 A1 | 12/2016 | Destraves et al. | |
| | | | G06K 7/10128 |
| 2017/0057305 A1* | 3/2017 | Rokhsaz | B60C 23/0413 |
| 2017/0096037 A1* | 4/2017 | Smith | B60C 23/0476 |
| 2017/0250633 A1* | 8/2017 | Moiraghi | B60C 23/0447 |
| 2017/0341323 A1 | 11/2017 | Destraves et al. | |

OTHER PUBLICATIONS

International Search Report issued by WIPO dated Jan. 29, 2016, in connection with International Application No. PCT/EP2015/079248 (with English translation attached).

Jan. 29, 2016 International Search Report and Written Opinion in International Patent Appln. No. PCT/EP2015/079248.

* cited by examiner

AUTONOMOUS ELECTRONIC SYSTEM

TECHNICAL FIELD

The present invention lies within the field of embedded electronic systems. More specifically, the present invention lies within the field of electronic systems intended to make measurements and/or recordings of data relating to the system in which they are embedded. This invention is applicable notably, but not exclusively, to electronic systems embedded in tires fitted to ground and/or aerial vehicles.

RELATED ART

There are numerous known self-powered embedded electronic systems which make recordings that are temporarily stored in memory before being transmitted to a remote system for subsequent analysis and use.

However, it has been found that, in numerous situations, communication between the embedded electronic system and the remote interrogating system is interrupted, making the data inaccessible.

Such an interruption of communication occurs, for example, if the power supply of the electronic system is exhausted or fails, or if the electronics suffer serious damage.

Among the numerous existing systems, an example that may be cited is a system for counting the number of landings made by the tires of an aircraft. The life of such tires is not estimated in terms of time, but in terms of the number of take-offs and landings, and it is therefore helpful to know this information. The take-off and landing of an aircraft are events imposing high levels of stress on the tires and landing gear, which may result in damage to the power supply of the electronic counting system.

In this situation, the only known solution for retrieving the data recorded in the embedded electronic system is that of repairing this system. However, it has been found that repairing or extracting the system in this way may be a complicated procedure, notably in cases where the electronic system is closely integrated or incorporated in the vehicle in which it is embedded, or in a component of the vehicle such as a tire.

Thus, in the example of the device for counting the number of landings, electronic circuit card of the embedded system is usually incorporated in a layer of rubber of the tire. The repair or extraction of such a card is therefore time-consuming, and may cause irreversible damage to the device.

The present invention therefore proposes to provide an embedded electronic system which will enable these drawbacks to be overcome.

BRIEF DESCRIPTION OF THE INVENTION

Accordingly, the invention relates to a self-powered electronic system to be embedded in a tire on a ground or aerial vehicle, the system comprising:
- an electronic device for measuring and/or recording data on the vehicle or its use,
- and means for transmitting these data to a remote interrogation system, the system being characterized in that it further comprises:
- a passive data storage medium that can be remotely interrogated, and
- means of communication between the electronic recording device and the passive storage medium.

In an advantageous embodiment, the data recorded in the device relate to the tire, its use or its state. The invention therefore offers a solution to the aforementioned problem by using a passive data storage medium that can be remotely interrogated. The passive nature of the medium enables all the drawbacks of the power supply system of the electronic device to be overcome. Thus, if the electronic device should cease to operate because of an electrical or electronic failure or the discharging of the battery, it is still possible to read data saved on the passive storage medium.

Additionally, because this device can be remotely interrogated, the data can be retrieved without the need to physically extract the device. This is particularly advantageous in the aforementioned case in which the electronic system is highly integrated, for example by being incorporated into a layer of rubber of a tire, notably in an aircraft tire.

The means of communication between the electronic recording device and the passive storage medium provide a read/write link.

Advantageously, the passive storage medium is adapted to be remotely powered by a remote interrogation system. This remote power supply is provided, for example, by the incident radiation from a data reader.

In an advantageous embodiment, the passive storage medium is physically separate from the measuring and/or recording device. The provision of this physical separation makes it possible to reduce the risk that both devices will be damaged at the same time in case of impact.

In an advantageous embodiment, the passive data storage medium is an RFID device.

In another advantageous embodiment, the means of communication between the electronic recording device and the passive storage medium belong to the group comprising a wired connection, an inductive connection, a radio frequency connection and an optical connection.

In another advantageous embodiment, the electronic measuring and/or recording device comprises a temporary storage medium.

In another advantageous embodiment, the means for transmitting these data to a remote interrogation system comprise a radio frequency wireless link.

BRIEF DESCRIPTION OF THE DRAWINGS

Other objects and advantages of the invention will become clearly apparent from the following description of a preferred, but non-limiting, embodiment, illustrated by the following drawings, in which.

DESCRIPTION OF THE BEST EMBODIMENT OF THE INVENTION

Figure 1:
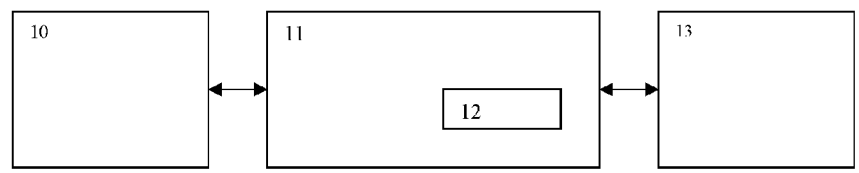
FIG. 1 shows a simplified diagram of a system according to the invention.

FIG. 1 shows a simplified diagram of an electronic system according to the invention. This system comprises an electronic measuring and/or recording device 11. This device is self-powered, and comprises a temporary storage medium 12.

The system further comprises a passive data storage medium 10, for example an RFID device, and also comprises radio frequency transmission means for communicating with a remote system 13.

Figure 2:
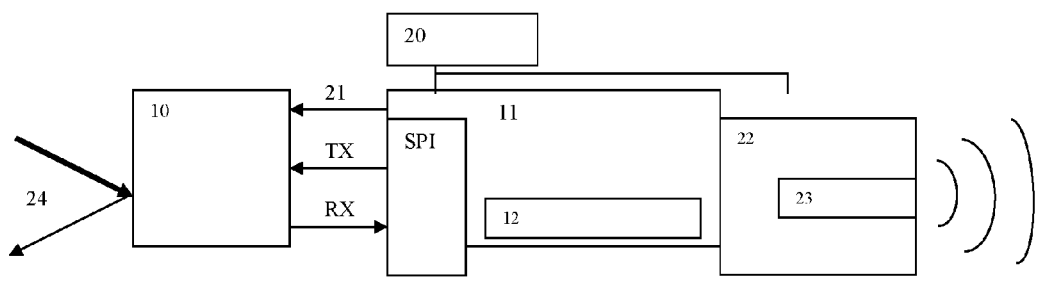
FIG. 2 shows the various data flows in a system according to the invention.

FIG. 2 details the specific technical features of the system shown in FIG. 1.

Thus the electronic device 11 comprises a power supply 20. This power supply is, for example, an accumulator, a battery, or a piezoelectric device.

This device 11 comprises a radio frequency communication stage 22 comprising a radio frequency transmitter 23 for communicating with the remote system not shown in this figure.

The device 11 is also connected to a passive storage medium 10. This medium is advantageously an ultra-high frequency (UHF) RFID device. The connection between the device 11 and the storage medium 10 is provided by a series wired communication interface, for example an SPI (Serial Peripheral Interface) or 120 bus. These communication interfaces comprise at least one bidirectional transmission channel TX/RX and a clock signal 21.

The clock signal 21 is used to time the regular transmission of data from the temporary medium 12 to the passive medium 10. The regular data transmission consists, for example, in the copying of the latest data on the state of the vehicle or tire in which the system is embedded, and/or an incrementation of its counters, and updates the date of the last back-up.

This passive storage medium 10 is then interrogated by a reader via a passive RFID link 24. When the passive medium 10 is interrogated by a remote reader, the incident radiation from the reader enables the RFID device to be powered while also enabling the retrieval of the data.

The invention claimed is:

1. A self-powered electronic system useable in a ground vehicle or an aerial vehicle, the electronic system comprising:
   a first storage medium configured to store data relating to a vehicle used with the electronic system, the data including data regarding use of the vehicle;
   a transmitter, which transmits the data to a remote system;
   a second storage medium, which is a passive storage medium and which is able to be remotely interrogated; and
   communication means, which enables communication between the first storage medium and the second storage medium,
   wherein the communication means is structured to transmit the data from the first storage medium to the second storage medium for storage in the second storage medium, and
   wherein the electronic system is structured to be embeddable in a layer of a tire for the vehicle.

2. The system according to claim 1, wherein the second storage medium is structured to be remotely powered by a remote interrogation system.

3. The system according to claim 1, wherein the second storage medium is physically separate from the first storage medium.

4. The system according to claim 1, wherein the second storage medium is an RFID device.

5. The system according to claim 1, wherein the communication means is one of:
   a wired connection, an inductive connection, a radio frequency connection, and an optical connection.

6. The system according to claim 1, wherein the first storage medium includes a medium structured for temporary storage.

7. The system according to claim 1, wherein the transmitter includes a radio-frequency wireless link.

8. The system according to claim 1, wherein the electronic system is embedded in an aircraft tire.

9. The system according to claim 1, wherein the data transmitted from the first storage medium to the second storage medium includes a most recently obtained vehicle data.

10. The system according to claim 1, wherein the data transmitted from the first storage medium to the second storage medium includes a most recently obtained tire data.

11. The system according to claim 1, wherein the data transmitted from the first storage medium to the second storage medium includes an incremental value of a counter.

12. The system according to claim 1, wherein the communication means uses a clock signal to time regular transmission of data from the first storage medium to the second storage medium, and
   wherein in conjunction with the transmission, chronological information regarding a last back-up is updated.

13. A self-powered electronic system embeddable in a tire for a ground vehicle or a tire for an aerial vehicle, the self-powered electronic system comprising:
   a first storage medium configured to store data relating to a vehicle carrying the electronic device, the data including data regarding use of the vehicle;
   a transmitter, which transmits the data to a remote system;
   a second storage medium, which is a passive storage medium and which is able to be remotely interrogated; and
   communication means, which enables communication between the first storage medium and the second storage medium and which includes a serial wired communication interface that includes a bidirectional transmission channel structured to transmit the data from the first storage medium to the second storage medium for storage in the second storage medium,
   wherein the communication means uses a clock signal to time regular transmission of data from the first storage medium to the second storage medium, and
   wherein in conjunction with the transmission, chronological information regarding a last back-up is updated.

14. The system according to claim 13, wherein the serial wired communication interface includes an SPI interface or an I2C interface.

15. A system according to claim 13, wherein the system is embedded in a layer of the tire.

* * * * *

UNITED STATES PATENT AND TRADEMARK OFFICE
CERTIFICATE OF CORRECTION

PATENT NO. : 10,242,512 B2  
APPLICATION NO. : 15/534636  
DATED : March 26, 2019  
INVENTOR(S) : Julien Destraves Page 1 of 1

It is certified that error appears in the above-identified patent and that said Letters Patent is hereby corrected as shown below:

In the Specification

Column 3:
Line 15, "120" should read --I2C--.

Signed and Sealed this
Twenty-eighth Day of April, 2020

Andrei Iancu
*Director of the United States Patent and Trademark Office*